United States Patent [19]
DuPont

[11] 3,932,048
[45] Jan. 13, 1976

[54] FURNITURE JOINTING ARRANGEMENT
[75] Inventor: Paul R. DuPont, Gillette, N.J.
[73] Assignee: Thermoplastic Processes, Inc., Stirling, N.J.
[22] Filed: Jan. 17, 1975
[21] Appl. No.: 541,885

[52] U.S. Cl. ............... 403/225; 403/298; 403/295
[51] Int. Cl.² ....................................... F16B 12/40
[58] Field of Search .......... 403/372, 292, 298, 295, 403/225, 226, 297, 221, 222, 223, 172, 171, 176

[56] References Cited
UNITED STATES PATENTS

| 1,609,130 | 11/1926 | Schacht | 403/359 X |
| 2,061,811 | 11/1936 | Sinko | 403/225 |
| 2,578,809 | 12/1951 | Ketchum | 403/225 X |
| 2,679,911 | 6/1954 | Bhend | 403/292 X |
| 2,753,886 | 7/1956 | Powers | 403/225 X |
| 3,218,097 | 11/1965 | Bowers et al. | 403/295 |
| 3,515,417 | 6/1970 | Bowman | 403/372 |
| 3,759,623 | 9/1973 | Hesse | 403/298 |
| 3,851,980 | 12/1974 | Worth | 403/292 X |

Primary Examiner—Andrew V. Kundrat

[57] ABSTRACT

A furniture joint for joining hollow-ended structural sections of modular furniture and especially the highly finished elements employed in the steel-and-glass-look type of furniture. This type of furniture requires a continuity of surface appearances having mirror-like attributes. The joining of the hollow-ended sections which advantageously may be cut from available lengths of mirrorized plastic tubing is accomplished by the use of a splined collar of elastomeric material and connector spuds which fit in the annular spaces between the connector arms and the tubing. The splines of the collar are adapted to be torsionally distorted ("squeegeed") during assembly. This distortion of the splines prevents the joint from inadvertently coming apart under the axial strain that the furniture joint may be expected to carry in normal use. However, the joint may be disassembled and the elements reused if rotational twisting is employed together with a pulling effort.

6 Claims, 3 Drawing Figures

FURNITURE JOINTING ARRANGEMENT

BACKGROUND OF THE INVENTION

This invention relates to modular furniture and more particularly to a semi-permanent joint structure by means of which components of such furniture may be assembled in desired combinations.

The recent popularity of glass-and-steel "architectural" furniture has been reflected by a demand for display cases, tables and racks which bear a similar sleek and shiny look.

The glass-and-steel type of furniture may be constructed using sheets of plate glass or plastic and structural elements of polished aluminum, stainless steel or chrome plated metal. More recently, mirrorized plastic structural elements have become available. One example of the mirrorized plastic shapes which have found commercial acceptance are marketed under the trademark "Mirron", a trademark for mirrorized thermoplastic extruded shapes manufactured and sold by Thermoplastic Processes, Inc. of Stirling, N.J. In this type of material, a thin coating of vaporized aluminum is applied to plastic rods, bars and tubing to form a highly silvered or mirror-like finish. The rods or bars of Mirron when used with clear or colored plexiglass or lucite sheets may be arranged to form modules of glass-and-steel look furniture. The modules may be arranged to form cocktail or other types of household tables or display stands, shelves, or racks for the display-case industry.

Because the attractiveness of mirrorized plastic structural shapes depends upon the mirrorized finish being unmarred during the assembly process, the type of joining arrangement employed can be critical. Heretofore this has necessitated that the structural shapes be assembled in the shop under carefully controlled conditions so that the welding or gluing operations that are used will not cause marring of the mirror-like finish of these elements. Because of the need for shop fabrication, it has been difficult for some segments of the display case industry to maintain an adequately diverse stock of different sizes and configurations of the tables, racks, etc., promptly to respond to orders as they are placed. It would be extremely advantageous, therefore, to allow glass-and-steel look furniture to be manufactured from a variety of easy pre-stockable components that permitted field assembly with no special tools and yet which achieved a great variety in assembly combinations.

When modular furniture is used to build display cases or tables, another problem is introduced by the occasional desire of the user to rearrange his displays as the assortment of products to be displayed changes. Heretofore, this has largely necessitated the junking of existing display cases since once assembled, the components cannot be readily taken apart and reused. It would be advantageous to provide a joint for especially the glass-and-steel look display case that would permit disassembly of the display case and rearrangement and reuse of the old components or the addition thereto of new components with ease and safety.

SUMMARY OF THE INVENTION

The foregoing and other objects and features of my invention are achieved by providing a modular assembly joint for furniture which is particularly useful for the glass-and-steel look type of furniture. In accordance with my invention, in one illustrative embodiment thereof, extruded plastic mirrorized members may be joined together by the use of a die-cast mirrorized metallic spud having two or more arms pointing in predetermined directions. The extruded sections are joined to the spud arms by the use of an intermediary plastic fluted collar.

The fluted collar which advantageously may be made of elastomeric plastic material such as E.V.A. or rubber, has an axial length somewhat less than that of the spud arm. The collar is fitted over the spud arm and then the open end of the extruded shape is forced over the collar with a twisting motion. The fit between the outer diameter of the spud arm and the inner diameter of the fluted collar is such as to cause the collar to bend on the spud arm while the extruded member is being twisted and pushed over the collar. The fit between the fluted collar and the extruded member is such as to cause a skewing deformation along the axial length of the collar flutes as the extruded member is being twisted and pushed on. The skew of the collar flutes remains unrelieved when the extruded member has been completely assembled to the spud. When so assembled, the arrangement of my invention will sustain the normal axial load forces that may be encountered when the furniture item is in use. The skewing of the collar prevents normal axial force from allowing the hollow-ended member to disengage itself from the collar while the binding of the collar upon the spud is responsible for the collar remaining secured to the spud. Since the tubing is effectively secured to the skewed collar and the collar is secured to the spud, the tubing and the spud are effectively affixed to each other.

Further in accordance with my invention, the joint may be disassembled by applying a rotational twisting force and by reversing the axial thrust that was used during assembly.

As mentioned above, the spud is made slightly longer than the length of the collar to provide clearance for the elongation of the collar which may normally be expected during the assembly operation. This permits a flush joint between the spud body and the end of the extruded member with no protrusion of the collar skirt into view.

DESCRIPTION OF THE DRAWING

The foregoing and other objects and features of my invention may become more apparent by referring now to the drawing in which.

GENERAL DESCRIPTION

Figure 1:
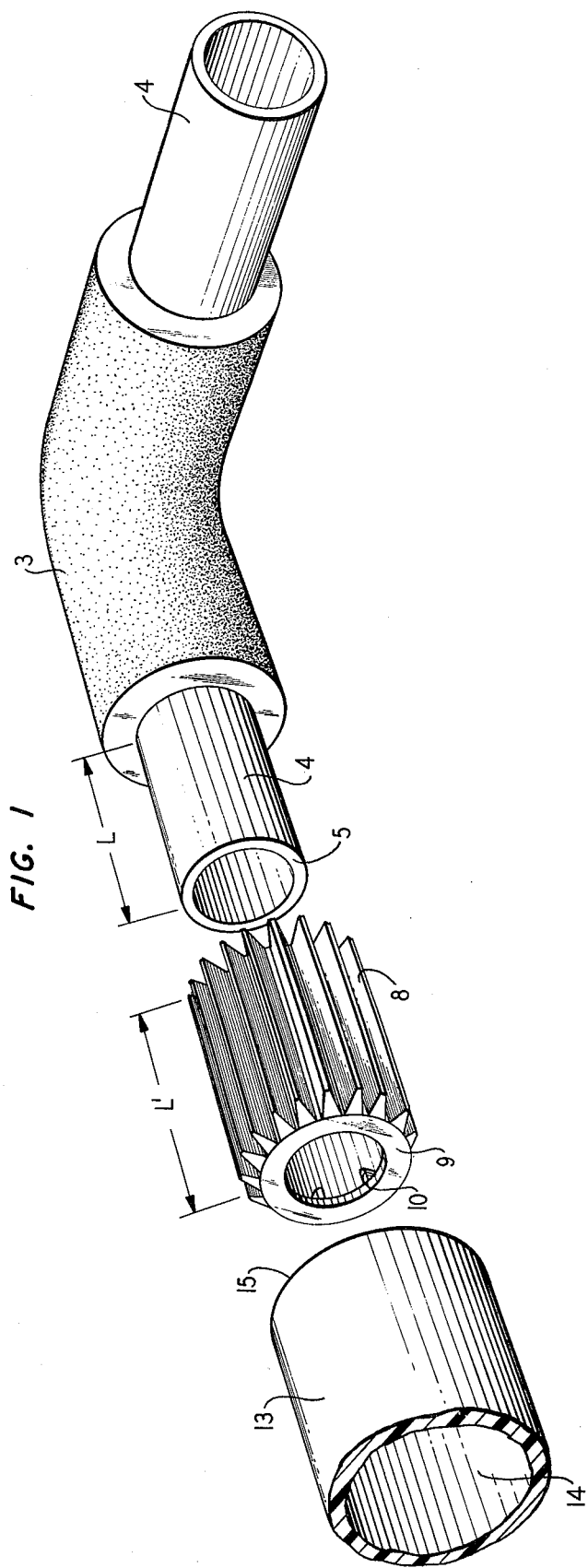
FIG. 1 shows an exploded view of a two-armed spud, and elastomeric splined collar and the open end of and extruded, mirrorized shape to be fitted to the spud in accordance with my invention.

In FIG. 1 a two-arm, right-angle bend spud 3 is shown together with a splined collar of elastomeric material 8 and the open end section of a mirrorized extruded plastic tube 13. The spud 3 may be made of any suitably rigid material and is preferably of a die-cast material capable of receiving a high luster finish. The left-hand arm 4 of spud 3 has an axial length L which is somewhat greater than the axial length L' of a collar 8. The outer end of the spline collar 8 is partially closed by a ring-shape section 9 on which are positioned a plurality of bumpers 10. Bumpers 10 serve to stiffen the flange 9 and also limit the axial engagement of collar 8 on spud arm 4 by making contact along the periphery 5 of arm 4. In assembly, collar 8 is forced over spud arm 4 and then the open end 14 of tubing 13 is forced over collar 8 with axial thrust and rotation in a continuous direction. Rotation of assembly may be either clockwise or counterclockwise.

Figure 2:
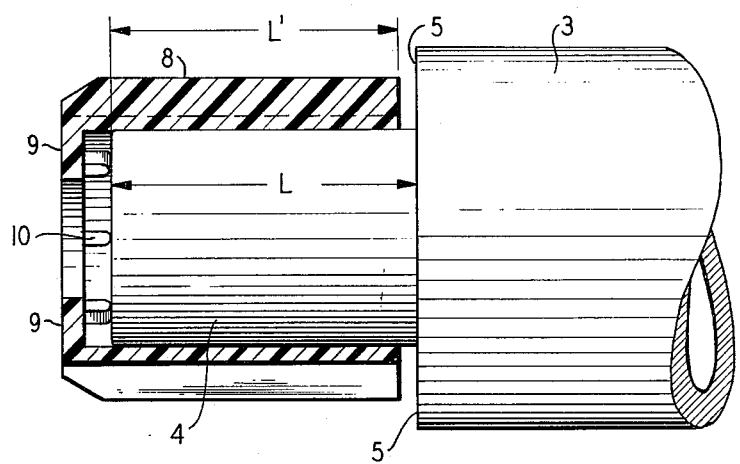
FIG. 2 shows a cross-sectional view of the splined collar fitted over one spud arm.

In FIG. 2, there is shown a cross-section of the collar 8 fitted onto spud arm 4 showing the respective distances L and L' and the internal bumpers 10 of the collar 8. The distance L minus L' is provided so that when the tubing 13 is forced over collar 8, the elongation in the dimension L' of collar 8 caused by the straining of the elastomeric material will be somewhat less than the clearance distance L minus L'. This will permit a flush abutment of the end 15 of tubing 15 with the cheek 5 of spud 3. The flush abutment adds to the continuity of appearance of the high luster or mirrorized materials comprising tubing 13 and spud 3.

Figure 3:
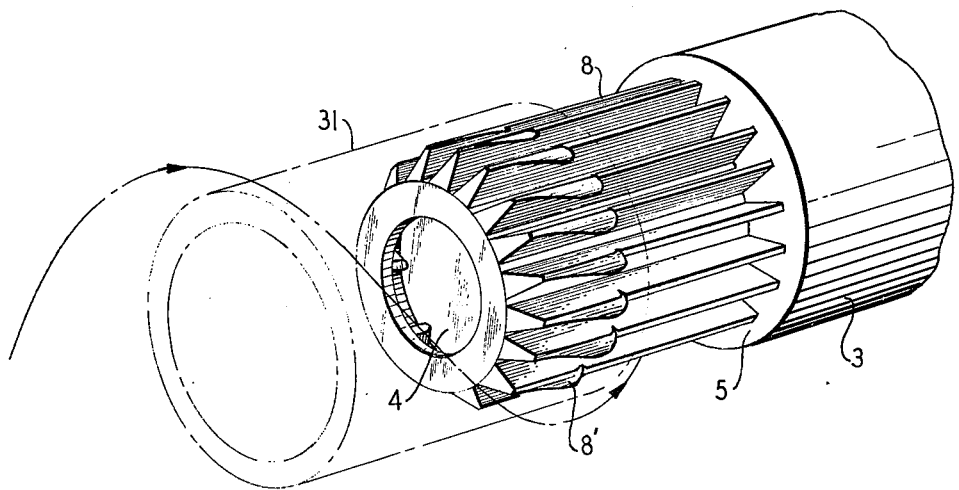
FIG. 3 shows the skewed distortion of the collar flutes occurring incident to the assembly of the extruded section to the spud arm.

FIG. 3 is a view showing the use of a transparent tubular section 31 instead of the mirrorized tubing 13 of FIG. 1. In practice, transparent tubing would only be rarely used by the ultimate consumer since the consumer demand is for the mirrorized-finish tubing. However, a transparent tube may quite advantageously be used by a manufacturer incident to choosing the dimensions of collar 8 to mate with a particular internal diameter of tubing. This is because the use of a transparent tube shows just when the assembly of my invention exhibits the most advantageous characteristics of fit. For example, when a new size of plastic tubing is to be employed, the exact type of fit required can be obtained with minimun experimentation by using transparent tube 31 whose internal diameter is chosen so as to produce the squeegeeing effect on the splines of the splined collar 8 that is shown in FIG. 3: When the splines 8' are both helically distorted by the net twist imparted to collar 8 and also elongated the amount (L-L') by the axial thrust applied during assembly, and the fit of collar 8 on spud arm 4 is sufficiently snug so that the collar 8 does not itself rotate upon arm 4, the optimum dimensions exist.

The squeegeed splines 8' maintain tube 31 firmly secured to the spud arm 4 until it is desired to disassemble the joint. At that time, by applying a reverse thrust, i.e., pulling instead of pushing and an opposite twist, tube 31 may effectively be screwed off splined collar 8 permitting all of the components to be reused in another assemblage.

In FIG. 1 of the drawing, a right angle spud 3 has been shown having two arms 4. It will be appreciated that spuds having three, four, or six arms at various other angles to each other in addition to the 90° spud will be appropriate and may be conveniently manufactured. Furthermore, various other shapes of tubing 13 besides the cylindrical may be employed so long, of course, as the end portion 14 therof is hollow to receive the splined collar 8.

I have thus shown a simple arrangement for joining hollow-ended sections of modular furniture which arrangement can be employed without the use of special tools or skilled personnel. The availability of such a joint makes possible assembly and disassembly of furniture at the point of ultimate use. All that need be stocked are lengths of hollow-ended tubing of a particular internal diameter, appropriate splined collars and spuds having the desired number of arms. Moreover, the tubing lengths need not be stocked by the distributor in custom sizes but can be stocked in standard sizes and cut on the job by the customer. The joint so provided is flush and continuous in appearance and when used with mirrorized extruded plastic shapes and mirrorized spuds provides an attractive structural assembly that is especially suitable for glass-and-steel look furniture.

What is claimed is:

1. A furniture joint comprising a connector having at least one spud arm, a splined collar of elastomeric material adapted to fit snuggly over said spud arm, said splined collar having a flange at one end thereof partially enclosing said one end and a plurality of bumper elements extending inwardly and axially from said flange, said bumper elements being located so as to contact an end surface of said spud arm, and a hollow-ended member having an internal diameter dimensioned to fit over and helically squeegee and elongate the splines of said collar during assembly.

2. A furniture joint according to claim 1 wherein said collar is dimensioned so as to fit over said spud arm with sufficient snugness to prevent rotation thereon when said hollow member is twisted with respect to said spud arm during said assembly.

3. A furniture joint in accordance with claim 1 wherein said internal diameter of said hollow-ended member is so dimensioned and said elastomeric material of said splines is so selected as to cause said helical squeegee to remain set during the application of a thrust and twist opposite to that applied during said assembly.

4. A furniture joint in accordance with claim 1 wherein said connector is of mirror-finished metal and wherein said hollow-ended member is of externally-mirrorized extruded plastic tubing.

5. A furniture joint in accordance with claim 4 wherein said spud arm includes a portion having an axial length longer than the the axial length of said spline collar by an amount sufficient to compensate for the elongation of said collar during said assembly whereby said hollow-ended externally mirrorized member and said mirror-finished connector may be smoothly abutted.

6. A collar for insertion in the annular clearance between the male and female members of a furniture joint comprising a substantially cylindrical elastomeric shell having a plurality of elongate splines thereon, said shell being of a material having sufficient resiliency to undergo elongation during assembly of said members, a flange at one end of said shell partially enclosing said one end, and a plurality of bumper elements extending inwardly and axially from said flange, said bumper elements being located so as to space said flange a predetermined distance away from an end surface of one of said furniture joint members.

* * * * *